July 8, 1924.

W. PRESTON

ANIMAL TRAP

Original Filed May 17, 1921

1,500,332

Inventor
William Preston.

By Herbert E Smith
Attorney

Patented July 8, 1924.

UNITED STATES PATENT OFFICE.

WILLIAM PRESTON, OF SPOKANE, WASHINGTON.

ANIMAL TRAP.

Application filed May 17, 1921, Serial No. 470,388. Renewed December 10, 1923.

*To all whom it may concern:*

Be it known that I, WILLIAM PRESTON, a citizen of the United States, residing at Spokane, in the county of Spokane and State of Washington, have invented certain new and useful Improvements in Animal Traps, of which the following is a specification.

My present invention relates to improvements in animal traps of the burrow type involving the use of impaling jaws one of which is movable, and released by pressure or weight of the animal upon a releasing platform or table. The primary object of the invention is the provision of a device of this kind which is to be placed in the burrow for catching squirrels, gophers, and other animals that make their homes in the ground, the trap preferably being used at the mouth or opening of the burrow for catching the animal in an attempt at exit from the burrow.

The invention consists in certain novel combinations and arrangements of parts whereby an effective trap is provided, that is readily adapted for utilization in a burrow entrance, which is durable, comparatively inexpensive in cost of production, and composed of a practical minimum number of parts.

In the accompanying drawings I have illustrated one complete example of the physical embodiment of my invention wherein the parts are combined and arranged according to the best mode I have thus far devised for the practical application of the principles of my invention.

Figure 1:
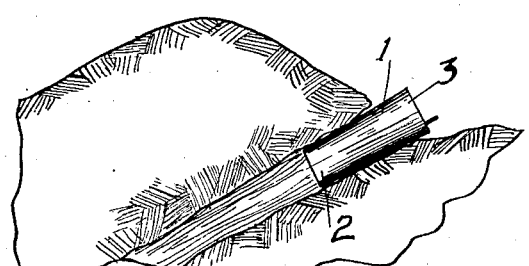
Figure 1 is a view showing a section of ground at the entrance to a burrow with the trap of my invention in place and set for the animal.
Figure 2:
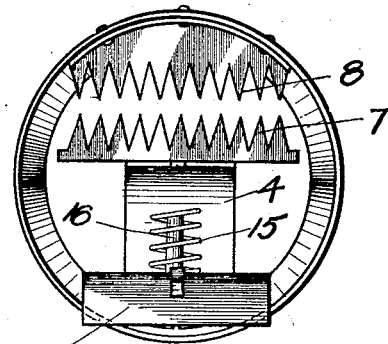
Figure 2 is an end view of the trap, enlarged, showing the jaws in closed position, after the trap is sprung.

In the preferred form of the invention as shown in the drawings I utilize a tubular casing or pipe section 1 preferably of sheet metal and tapered with the smaller end 2 for insertion into the burrow leaving the larger end 3 at the opening of the burrow, the trap being designed and located to catch the animal in attempting to come out of the burrow.

Figure 3:
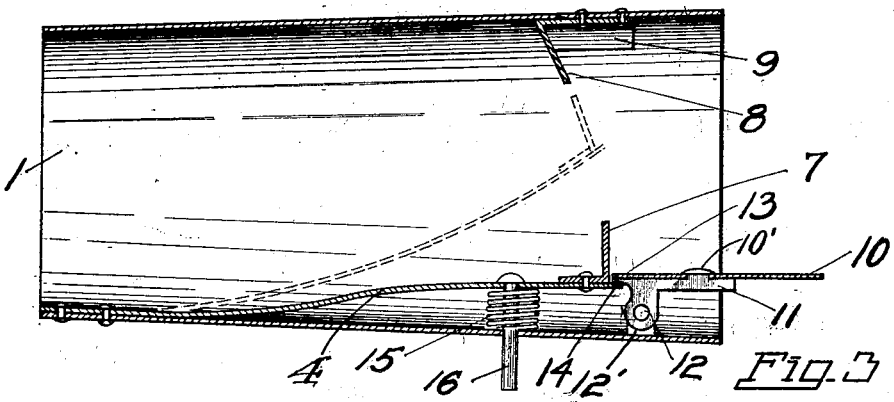
Figure 3 is a longitudinal sectional view through the trap in set position, and showing in dotted lines the movable jaw in closed or sprung position.
Figure 4:
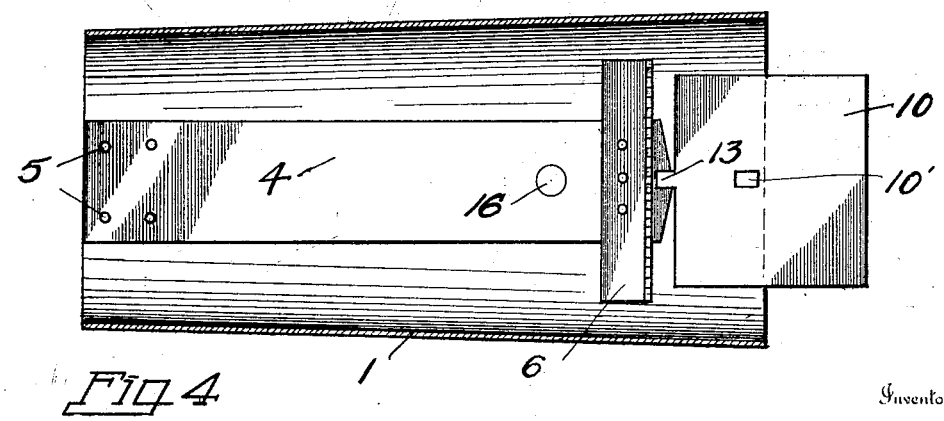
Figure 4 is a horizontal, longitudinal, sectional view of the trap casing, showing the movable jaw set.

Within the casing is a longitudinally disposed spring plate or resilient metallic strap 4, which is firmly secured, as by rivets near the smaller end of the casing, at 5, and the spring plate extends toward the larger end of the casing as shown in Figures 3 and 4.

At the free end of the spring plate an angular jaw 6 is riveted and provided with perpendicular teeth 7 projecting therefrom, which, when the trap is located in proper position, stand erect or in a vertical plane.

The movable jaw and teeth are designed to co-act with the teeth 8 of the fixed jaw 9, which is riveted within the casing near the larger end thereof, with its depending teeth 8 horizontally disposed in alinement and in position directly above the movable teeth 7 when the trap is sprung, for the purpose of impaling the animal above and below its body between the fore and hind legs.

At the outer or larger end of the casing is utilized a plate 10, preferably of metal and rectangular in shape, and disposed horizontally. This plate is designed to be depressed from set position in Figure 3, by the fore feet of the animal, and at 10' is riveted securely to the bracket 11 which is pivoted at 12 in ears 12' secured within the casing at the bottom thereof. The pivoted bracket is fashioned with a detent 13 and the depressible plate is disposed in position in order that the detent may engage over the edge 14 or lip at the free end of the spring plate 4.

In setting the trap, the spring plate 4 is bent down or depressed as in full lines Figure 3, and then the depressible, pivoted plate 10 is swung on its pivot to bring the detent 13 of the plate 10 over the lip 14 of the spring plate 4. The resiliency of the plate 4 holds the lip 14 in contact with the detent with sufficient friction to maintain both the spring plate and the depressible plate in set position, but it will readily be apparent that a slight pressure or weight applied to the depressible plate 10 will release the detent from the lip and thus permit the resiliency of the spring plate 4 to swing the movable jaw and its teeth to the dotted line position in Figure 3, thus closing the trap.

In addition to the resiliency of the spring plate 4, I may employ a helical spring 15 for closing the trap, the latter being attached at the underside of the spring plate 4 near its free end by the use of a guide pin 16, to provide additional force to the closing movement of the jaw on the spring plate and assist in holding the impaled animal from escape.

The operation of the device will be apparent from the above description in connection with the drawings, and it will be apparent that the animal is caught between the teeth of the respective upper and lower jaws, and held there in captivity for proper disposal. In trapping the animals one of the devices will be applied to each burrow opening as in Figure 1, and the effectiveness of the traps will be instrumental in exterminating the animals for the purpose of saving grains, and further the use of traps of this type eliminates the dangerous conditions accompanying the use of poisons for killing the animals.

Having thus fully described my invention, what I claim as new and desire to secure by Letters Patent is:—

The combination with a tubular casing having an upper, transversely arranged fixed jaw, of a longitudinally disposed spring plate fixed at one end and provided with a complementary jaw at its free end, a lip at the free end of the spring plate, a pivoted plate having a detent thereon to engage said lip and hold the trap set, and an actuating spring located between said spring plate and the casing.

In testimony whereof I affix my signature.

WILLIAM PRESTON.